Figure 5:
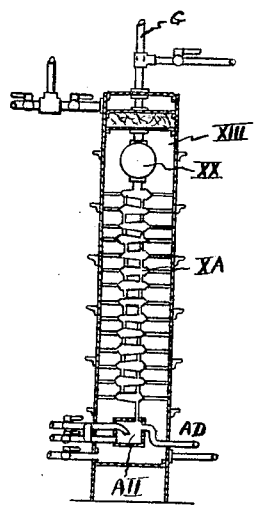

May 1, 1923. 1,453,374
F. DE M. ACCIOLY
PROCESS AND APPARATUS FOR THE MANUFACTURE OF NONPOTABLE ALCOHOLIC LIQUID
Filed Oct. 20, 1922 — 2 Sheets-Sheet 1
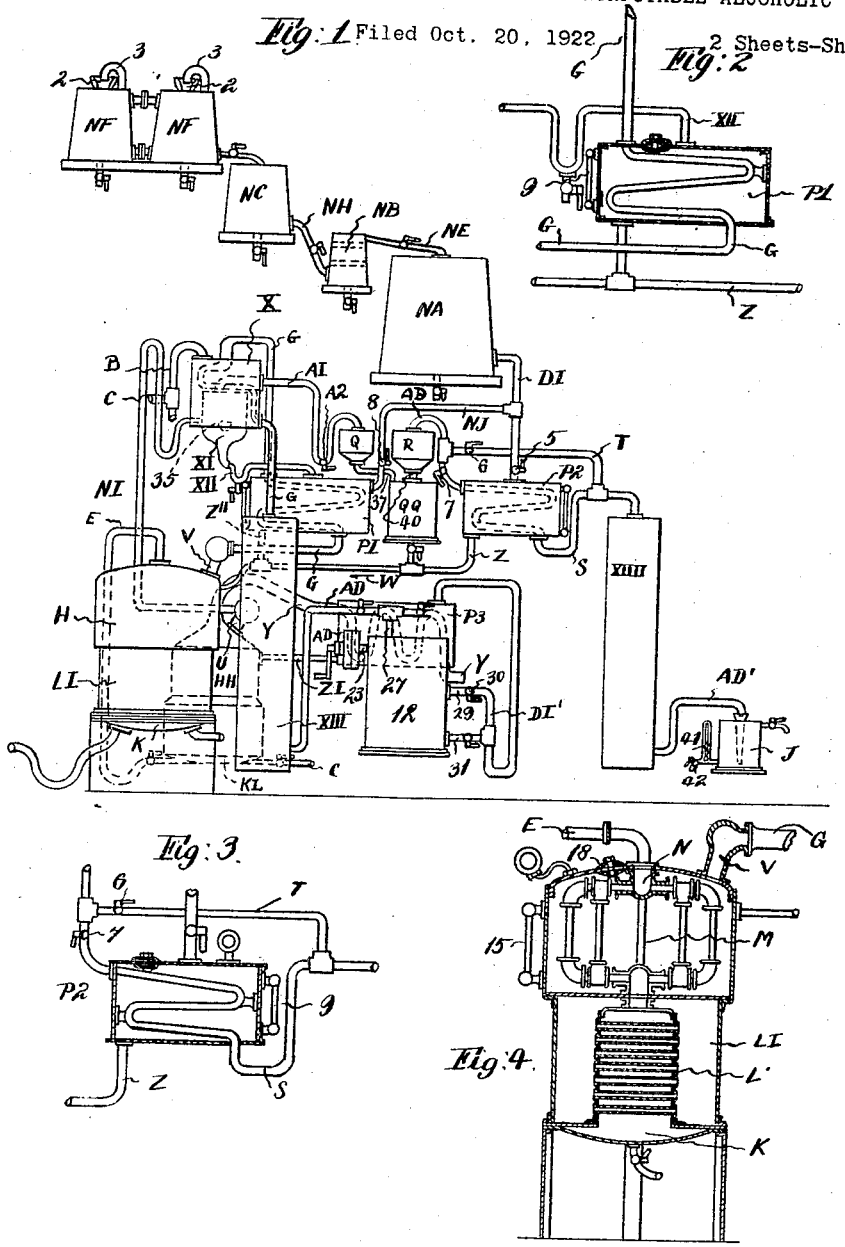
Witnesses:
Inventor: Francisco de Moura Accioly,
By his Att'y, May 1, 1923.                                                    1,453,374
F. DE M. ACCIOLY
PROCESS AND APPARATUS FOR THE MANUFACTURE OF NONPOTABLE ALCOHOLIC LIQUID
Filed Oct. 20, 1922                    2 Sheets-Sheet 2

Witnesses:                                   Inventor:
                                   Francisco de Moura Accioly,
                                   By his Att'y, Patented May 1, 1923.

1,453,374

UNITED STATES PATENT OFFICE.

FRANCISCO DE MOURA ACCIOLY, OF RIO DE JANEIRO, BRAZIL.

PROCESS AND APPARATUS FOR THE MANUFACTURE OF NONPOTABLE ALCOHOLIC LIQUID.

Application filed October 20, 1922. Serial No. 595,855.

*To all whom it may concern:*

Be it known that I, FRANCISCO DE MOURA ACCIOLY, a citizen of the Republic of Brazil, residing in Rio de Janeiro, Brazil, have invented certain new and useful Improvements in Processes and Apparatus for the Manufacture of Nonpotable Alcoholic Liquid, of which the following is a specification.

This invention relates to a process and apparatus for the manufacture of non-potable alcoholic liquid and it has for its object to produce an alcoholic liquid having a substantially high specific gravity, as compared with ordinary alcohol, and which upon combustion shall not produce any heavy residues thereby rendering it particularly adapted for use with internal combustion engines, or for lighting or heating purposes.

According to this invention the saccharine juices of certain fruits or saccharine juices prepared as hereinafter described have added to them a composition hereafter referred to as composition D and are fermented in a closed receptacle or vat, the liquid so obtained being mixed with a further preparation hereafter referred to as saccharoleum, and distilled. To the alcohol thus obtained there is added an enriching mixture, hereafter referred to as etherolic turpentine, after which the mixture is again distilled and the alcoholic liquid so obtained is rectified.

Whilst I do not desire to limit myself to any particular saccharine juices the following, or mixtures thereof, are suggested as suitable for the purpose.

1. The saccharine juice of the sugar cane,
2. The saccharine juices of all kinds of oranges,
3. The saccharine juice of the cashew, a tropical fruit,
4. The saccharine juices of all kinds of manioc,
5. The saccharine juices of beetroot and of water melons,
6. Where any or all of the juices above referred to are not available I take any kind of species of molasses, raw sugar, molasses sugar, or farofa raspadura (a coarse black sugar in brick form) and from these I form a solution of a specific gravity 12° Beaumé.

The fruits or cane as the case may be is crushed to express the juices. Or instead of this where the foregoing are not available I employ alcohol of 20° to 40° Beaumé obtained from sugar cane, which is mixed with composition A, hereinafter described, and which I prefer to term saccharoleum, to which is added a sufficient quantity of composition B, hereafter referred to as etherolic turpentine, and of composition C, hereafter referred to as alcatraloid, until a specific gravity of 30° Beaumé is indicated.

The nature and preparation of the various compositions just referred to are as given below:—

*Composition A or saccharoleum.*

| | |
|---|---|
| Orange peel | 500 grammes |
| Vegetable or mineral tar, Stockholm coal or petroleum tar | 60 grammes |
| Powdered naphthaline | 40 grammes |
| Sulphuric acid | 125 grammes |
| Plain water | 7 liters |

The peel is put into the water in order to boil for half an hour and this is afterwards strained. The tar is dissolved in the sulphuric acid and lastly the naphthaline is also dissolved in the latter, and all mixed with the liquid strained from the boiled peel in order to be afterwards united with the fermented juices as hereafter explained.

*Composition B or etherolic turpentine.*

| | |
|---|---|
| Liquid turpentine | 500 grammes. |
| Sulphuric ether | 1000 grammes. |
| Naphtha (sp. gr. 0.800°) | 3000 grammes. |
| Pure animal, vegetable or mineral oils | 500 grammes. |
| Hydrochloric or muriatic acid | 150 grammes. |
| Tar such as Stockholm, coal or petroleum tar | 50 grammes. |
| Powdered naphthaline | 20 grammes. | the above quantity being used for each 350 liters of alcohol.

*Composition C or alcatroloid.*

| | |
|---|---|
| Mineral or vegetable tar, Stockholm coal or petroleum | 100 grammes. |
| Sulphuric acid. A sufficient quantity to dissolve the tar. | |
| Alcohol at 36° Beaumé | 300 grammes. | the above quantity being used for each 350 liters of alcohol.

The acid is mixed with the tar until completely dissolved and in this condition the alcohol is added.

*Composition D, hereafter referred to.*

| | |
|---|---|
| Yeast | 200 grammes. |
| Tanic acid (tannin) | 100 grammes. |
| Neutral tartrate of potash | 1000 grammes. |
| Sulphuric acid | 100 grammes. |

These percentages are for 1000 litres of juice, the mixture being added to the saccharine juices to promote fermentation.

For carrying out the process any suitable apparatus may be employed.

An example of suitable apparatus for the purpose is illustrated in the accompanying drawings in which:—

Figure 6:
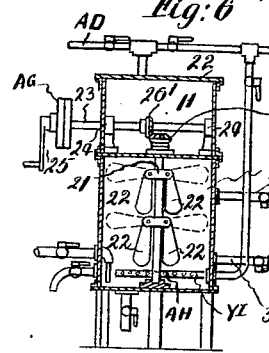
Figure 7:
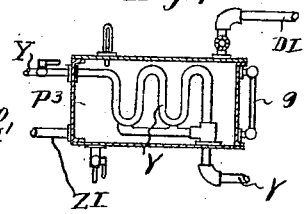
Figure 9:
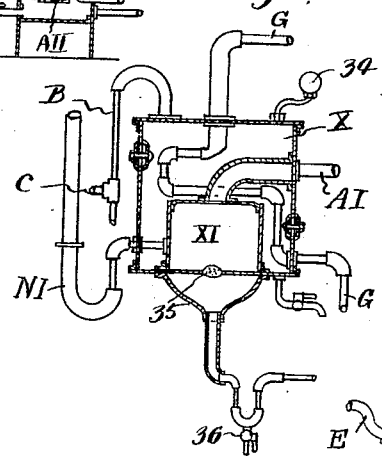
Figure 8:
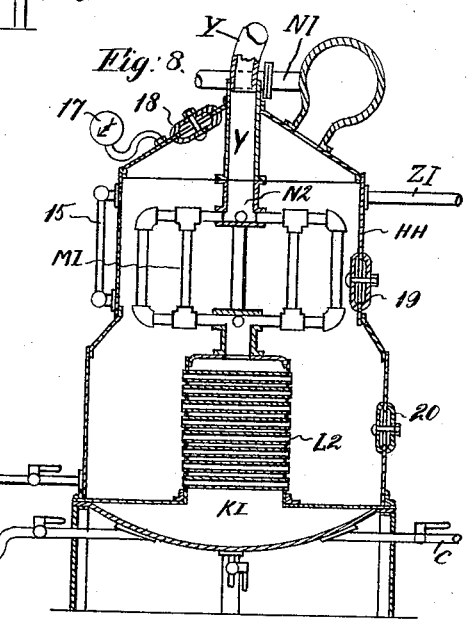

Fig. 1 is a general view of the plan of the whole series of the apparatus for effecting a continuous fermentation and distillation according to this invention, Fig. 2 is a sectional view of a tank which feeds the distilling apparatus of Fig. 4, Fig. 3 is a similar view of another tank which also feeds the distilling apparatus of Fig. 4, Fig. 4 is a sectional view of the still, Fig. 5 is a sectional view of the apparatus for rapid condensation, Fig. 6 is a view of a mechanical mixer, Fig. 7 is a view of a third tank supplying the apparatus shown in Fig. 8, Fig. 8 is a sectional view of the still fed by the tank shown in Fig. 7, Fig. 9 is a sectional view of an apparatus which receives the gases to be distributed to a second condenser.

Figure 10:
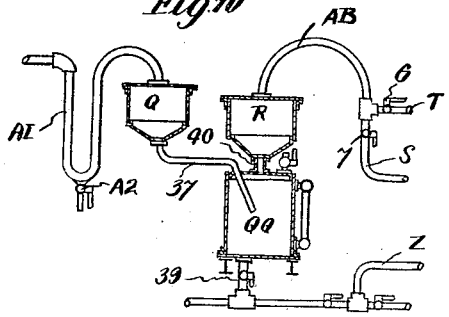
Figure 11:
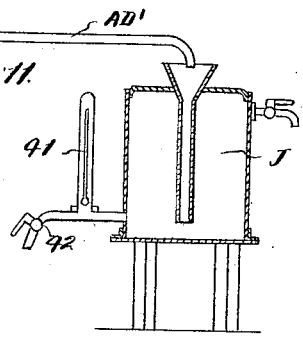

Fig. 10 is a sectional view of three cylinders which receive and separate the gases prior to their passage to the condenser, Fig. 11 is a sectional view of a tank which receives the liquid alcohol.

In carrying out the process any or all of the saccharine juices before referred to or mixtures thereof together with composition D are first placed in tanks indicated by NF and maintained at a temperature of 15° to 30° C. These tanks NF are made of wood with the upper part narrower than the lower, each having on the upper end a lid, not shown, provided with a door almost in the centre of the lid and an opening for the passage of one end of a bent tube 3 leading into the interior of the tank whilst the other extremity dips into a cup 2 made of china or metal which is placed on the top of the lid and is filled with any fixed oil, and through this oil the carbonic acid gas produced by the fermentation escapes.

The contents of the tanks, when fermentation is completed, show a surface in complete quiescence, the Beaumé hydrometer indicating zero which indicates that the whole fermentation has come to an end. All the fermented juice is conducted to the small tank NC, which, by another tube NH, leads to a small filter NB, the juice entering at the lower part of said filter and passing out at the upper part by means of the tube NE into a large collecting tank NA.

The glucose which by means of this fermentation is transformed into alcohol is mixed in the connecting tank NA with a certain percentage of saccharoleum or composition A, which percentage should be adjusted in accordance with the materials used to give alcohol of 30° Beaumé at the chamber AII later to be described.

The liquid after the addition of composition A passes by the tube D1 to the tank P2 its passage thereto being controlled by the cock 5, or it may pass to a second tank PI by the pipe NJ provided with a cock 8, one or both tanks being filled or one filled and the supply cut off and the other tank filled alternately.

The tanks PI, P2 provide a continuous supply to the still H passing thereto by pipes Z, $Z^{11}$ the path of the liquid and gases being shown by the arrow $w$. The contents of tanks PI, P2 are heated as will be hereafter more fully explained by means of tubes S and G through which pass the heated products from the stills H, HH.

The still H just referred to comprises an outer case, Figs. 1 and 4 in which is placed a dome like structure LI through which pass a number of horizontally disposed tubes L through which the liquid passes becoming rapidly heated and causing a considerable evolution of gas. Wet and superheated steam is supplied to the still by means of a suitable boiler.

The steam mixes at the bottom of the still in the chamber K passing around the tubes L and thence through the vertically disposed pipes M extending between horizontally disposed pipes radiating from two centrally disposed hollow bosses or chambers from the upper of which N the steam escapes to a pipe E by which it passes to a second still HH, Figs. 1 and 8, and of substantially identical construction as that H already described, and to the lower end of which a further supply of superheated steam is admitted by pipe C. In Fig. 8 KL indicates the lower mixing chamber for the steam L2 the tubes passing through the inner dome and MI the steam pipes in the upper part of the still. N2 indicates the chamber to which the steam passes prior to escaping by the pipe Y. Manholes or doors, such as 18, may be provided upon the tops of the stills H, HH, and in addition other manholes, such as 19, 20, which covers may be provided upon the bodies of the respective stills. 17 indicated thermometers and 15 gauge glasses provided upon the stills H, HH, similar glasses 9 being provided upon the tanks PI, P2, and P3.

The distillation products leave the still H at V passing into the pipe G which, as aforesaid, passes through tank PI said tube G leading to a device X, Figs. 1 and 9, and which device comprises an outer case having an inner chamber XI, the purpose of which is hereafter more fully explained and from which case heated air escapes by pipes B and C. 34 indicates a pressure gauge.

The pipe G after leaving the device X passes to the upper end of a condenser XIII and is connected to a chamber XX through which the gases pass to the various cylinders or chambers XA of the said condenser XIII the products of condensation being collected in the chamber AII an ancohol of 30° Beaumé being obtained. The alcohol passes from the condenser to the mixer 12, Figs. 1 and 6, where it is mixed with composition B.

As will be seen on reference to Fig. 6 the mixer comprises an outer case having a cover 22 and an upper chamber 11 within which is mounted in bearings 24 a shaft 23 designed to be rotated by a belt passing over pulley AG or by means of the handle 25.

AH indicates a vertically disposed shaft mounted centrally of the mixer and provided with a bevel wheel 26 engaging a second similar wheel $26^1$ mounted upon shaft 23. Pivotally mounted to bodies such as 21 secured to shaft AH are blades 22 which under the influence of centrifugal force when shaft TH is rotated assume a horizontal position as indicated by the dotted lines and act as beaters or mixers for the contents of the said mixer 12.

The alcohol passes from the condenser XIII to mixer 12 by means of the pipe AD connected in its turn to a pipe 27 entering the upper end of the mixer.

Y indicates a steam pipe from still HH passing through and heating the contents of tank P3.

The pipe AB also passes downwards to a perforated pipe YI arranged in the bottom of the mixer and through which pipe YI alcohol may be admitted.

When necessary there is provided upon one side of the exterior of the mixer 12 a pipe 29 extending downward for approximately one third of the height of the mixer. This tube 29 is connected to a vertically disposed tube DI′ provided with a valve or cock 30 and having a second horizontally disposed pipe 31 connected thereto and to the lower part of the mixer. By this means all the mixture within the beater may be permitted to pass to the tube DI and into the collecting tank P3, Figs. 1 and 7.

The contents of the tank P3 are heated by the steam passing from the still HH by pipe Y which pipe also passes through the said tank P3. The tank P3 forms a supply through pipe ZI for the still HH which, as already explained, is substantially of the same construction as the still H so that further detailed description thereof is unnecessary.

The products of distillation leave the still HH at U passing by the pipe NI to the inner chamber XI of device X. 35 indicates a filter placed near the lower part of the device X and through which the heavier products pass and are permitted to pass to the tank PI by the pipe XII. 36 indicates a cock by which the chamber XI may be emptied.

The chamber XI communicates by means of a pipe AI with a cylinder Q, Figs. 1 and 10, the pipe AI being bent as shown and provided with a cock A2 (Fig. 10). 37 indicates a pipe by which the gases are permitted to pass to a second cylinder QQ having at the lower end a pipe controlled by a cock 39 whereby the heavier distillates are allowed to pass to a pipe Z and mix with the liquid passing to still H. Mounted upon the cover of cylinder QQ is a second cylinder R in communication with QQ by means of a pipe 40 and in which cylinder R the lighter distillates collect and from which they pass by pipe AB to a pipe T leading to a condenser or by a pipe S and are caused to pass through tank P2 prior to passing to the condenser XIII, cocks 6 and 7 controlling their passage in either direction.

After leaving the condenser XIII the alcohol which is of 90° Beaumé passes to the collector J, Figs. 1 and 11, by pipe AD and from which collector it is drawn off by the tap 42.

41 indicates a hydrometer whereby the density of the alcohol may be seen.

Where, as aforesaid, the saccharine juices are not available alcohol of 20° or 40° Beaumé, together with composition C, is employed being brought to the necessary strength by the addition of composition A or "saccharoleum", the treatment being thereafter as already described, that is to say the mixture after distillation has added to it composition B and is then treated in the manner described.

Claims.

1. A process for the production of non-potable alcoholic liquid, said process comprising mixing an alcohol-containing substance with acids and neutral tartrate of potash; mixing with the liquor thus produced a further preparation including saccharine juices, tar, naphthaline and acid; distilling the mixture to obtain alcohol; adding to the alcohol thus produced an enriching mixture including sulphuric ether, naphtha, oils, muriatic acid, tar and naphthaline; and distilling the enriched mixture.

2. A process for the production of nonpotable alcoholic liquid, said process comprising subjecting saccharine juices mixed with tannic acid, neutral tartrate of potash, and sulphuric acid to fermentation at a temperature of 15° to 30° C. in a closed vessel; mixing with the liquor thus produced a further preparation comprising liquor of orange peel, tar, naphthaline, sulphuric acid, and water; distilling the mixture to obtain alcohol; adding to the alcohol an enriching mixture comprising turpentine, sulphuric ether, naphtha, oils, muriatic acid and naphthaline; and distilling and condensing the enriched mixture.

In testimony whereof I have hereunto set my hand in the presence of two witnesses.

FRANCISCO de MOURA ACCIOLY.

Witnesses:
LAWRENCE COUSEN,
LEONARD F. WHITFIELD.